(12) United States Patent
Reddy et al.

(10) Patent No.: US 7,377,967 B2
(45) Date of Patent: May 27, 2008

(54) SPLIT FLOW PROCESS AND APPARATUS

(75) Inventors: Satish Reddy, Irvine, CA (US); Jeffrey Scherffius, Aliso Viejo, CA (US); John Gilmartin, Aliso Viejo, CA (US); Stefano Freguia, Aliso Viejo, CA (US)

(73) Assignee: Fluor Technologies Corporation

( * ) Notice: Subject to any disclaimer, the term of this patent is extended or adjusted under 35 U.S.C. 154(b) by 376 days.

(21) Appl. No.: 10/519,258

(22) PCT Filed: Jul. 3, 2003

(86) PCT No.: PCT/US03/21194

§ 371 (c)(1),
(2), (4) Date: Aug. 8, 2005

(87) PCT Pub. No.: WO2004/005818

PCT Pub. Date: Jan. 15, 2004

(65) Prior Publication Data

US 2006/0032377 A1 Feb. 16, 2006

Related U.S. Application Data

(60) Provisional application No. 60/393,595, filed on Jul. 3, 2002, provisional application No. 60/467,719, filed on May 2, 2003.

(51) Int. Cl.
*B01D 53/14* (2006.01)

(52) U.S. Cl. .......................... 96/242; 423/228; 423/229

(58) Field of Classification Search .................. 95/168, 95/181, 183, 235, 236, 160–163, 165–167, 95/169; 96/234, 242; 423/228, 229
See application file for complete search history.

(56) References Cited

U.S. PATENT DOCUMENTS

| | | | | |
|---|---|---|---|---|
| 1,971,798 A * | 8/1934 | Shoeld | ....................... | 423/223 |
| 2,437,288 A * | 3/1948 | Anderson | .................... | 423/229 |
| 3,851,041 A * | 11/1974 | Eickmeyer | ................... | 423/223 |
| 3,962,404 A * | 6/1976 | Giammarco et al. | ........ | 423/222 |
| 4,073,863 A * | 2/1978 | Giammarco et al. | ........ | 423/222 |
| 4,146,569 A * | 3/1979 | Giammarco et al. | ........ | 423/222 |
| 4,248,608 A * | 2/1981 | Giammarco et al. | .......... | 95/158 |
| 6,139,605 A * | 10/2000 | Carnell et al. | ................. | 95/164 |
| 6,800,120 B1 * | 10/2004 | Won et al. | ..................... | 96/234 |
| 7,056,482 B2 * | 6/2006 | Hakka et al. | ............... | 423/230 |
| 2004/0253159 A1 * | 12/2004 | Hakka et al. | ............... | 423/228 |
| 2005/0132883 A1 * | 6/2005 | Su et al. | ....................... | 95/235 |

\* cited by examiner

*Primary Examiner*—Frank M Lawrence
(74) *Attorney, Agent, or Firm*—Fish & Associates, PC (57) ABSTRACT

An acid gas removal plant includes an absorber that provides a rich solvent to two regenerators that independently generate a lean and a semi-lean solvent, wherein the semi-lean solvent is produced in one of the regenerators using heat and/or steam derived from the other regenerator. Further heat integration is particularly contemplated with power plants in which the power plant provides high-level heat to the acid gas removal plant and wherein the power plant receives low-level heat from the acid gas removal plant.

19 Claims, 4 Drawing Sheets

SPLIT FLOW PROCESS AND APPARATUS

This application claims the benefit of U.S. provisional application with Ser. No. 60/393,595, which was filed on Jul. 3, 2002, and of U.S. provisional application with Ser. No. 60/467,719, which was filed May 2, 2003, both of which are incorporated herein by reference.

FIELD OF THE INVENTION

The field of the invention is gas processing, especially as it relates to removal of acid gas components of various feed gases, and particularly flue gases.

BACKGROUND OF THE INVENTION

Various configurations and methods are known in the art to remove acid gas from a process gas (e.g., various distillation-, adsorption- and absorption processes), and among those regenerator-absorber systems are frequently employed as a relatively robust and cost-efficient gas purification system.

In a typical regenerator-absorber system, gas is contacted in an absorber in a counter-current fashion and the acid gas (or other gaseous component) is at least partially absorbed by a lean solvent to produce a rich solvent and a purified process gas. The rich solvent is then typically heated in a cross heat exchanger and subsequently stripped at low pressure in a regenerator. The so stripped solvent (ie., lean solvent) is cooled in the cross heat exchanger to reduce the temperature in the lean solvent before completing the loop back to the absorber. Thus, such regenerator-absorber systems typically allow continuous operation at relatively low cost. However, in many circumstances the extent of the acid gas removal efficiency is not satisfactory, and especially where the acid gas is carbon dioxide, stringent emission standards can often not be achieved with a standard regenerator-absorber system.

To overcome problems associated with carbon dioxide removal in such systems, the temperature in the regenerator may be increased. However, increased corrosivity and solvent degradation often limit the degree of optimization for this process. Alternatively, a split-flow absorption cycle may be employed in which the bulk of the solvent is removed from an intermediate stage of the regenerator column and recycled to an intermediate stage of the absorber. A typical split-flow process is described by Shoeld in U.S. Pat. No. 1,971,798. In this arrangement only a small portion of the solvent is stripped to the lowest concentration, and a high vapor to liquid ratio for stripping is achieved in the bottom trays of the regenerator, resulting in somewhat lower energy use at relatively low outlet concentrations. However, the reduction in energy consumption is relatively low due to thermodynamic inefficiencies in stripping (mainly because of variations in the solvent composition as it circulates within the split loop).

To circumvent at least some of the problems with the split loop process, various improvements have been made. For example, one improvement to the split-flow process is to more accurately control the concentration of solvents. To more accurately control the solvent concentrations, two modifications are generally necessary. The first modification comprises an intermediate reboiler, which may be installed to a main regenerator to boil off water from the semi-lean solvent to adjust the concentration of the semi-lean solvent stream to the concentration of the lean solvent. The second modification comprises a side-regenerator to regenerate condensate from the main regenerator. The condensate from the main regenerator is sent to the top section of the main regenerator, where it undergoes partial stripping, and is then further stripped to a very low concentration of dissolved gas in the side-regenerator, before being returned to the bottom reboiler of the main regenerator.

Since only a relatively small portion of the total solvent (typically ~20%) is stripped to the ultra-low concentration, relatively low outlet concentrations with comparably low energy use may be achieved. Furthermore, when methyl diethanolamine (MDEA) is employed as a solvent in the improved split-flow process, the liquid circulation can be reduced by about 20%. However, the modifications to improve energy use and lower solvent circulation generally require a substantial modification in the configuration of the main regenerator, and the installation of a side-regenerator, both of which may result in substantial costs and significant down-time of an existing absorber-regenerator system.

Another improvement to the split-flow process is described by Camell et al. in U.S. Pat. No. 6,139,605. Here, two regenerator columns are utilized wherein a primary regenerator produces a semi-lean solvent and wherein a secondary regenerator produces an ultra-lean solvent. A small portion of the purified process gas leaving the absorber is expanded to a lower pressure level thereby producing a cooled purified process gas. The heated ultra-lean solvent stream leaving the secondary regenerator is cooled by the cooled purified process gas thereby producing a heated purified process gas, which is subsequently fed into the secondary regenerator. The recycled gas is then recovered from the secondary regenerator and fed back into the feed gas stream at the absorber.

The use of a heated process gas instead of a reboiled solvent at the secondary regenerator advantageously lowers the partial pressure of the solvent vapor in the secondary regenerator, and allows the secondary regenerator to operate a lower temperature than the primary regenerator column. Operating the secondary regenerator at a reduced temperature typically results in a reduced corrosivity of the solvent, which in turn may allow for the use of cheaper materials such as carbon steel in place of the conventional stainless steel. Furthermore, a split-flow process using vapor substitution may be combined with fixed-bed irreversible absorption technology, e.g. to remove $H_2S$ and or COS from the recycle gas in a bed of solid sorbent, thereby ensuring a relatively long bed life of the absorber. However, due to the use of recycle gas and the use of a secondary regenerator column, retrofitting of existing absorber-regenerator combinations may be relatively expensive and time consuming.

Therefore, although various improvements to the basic configuration of an absorber-regenerator process are known in the art, all or almost all of them suffer from one or more disadvantages. Therefore, there is a need to provide improved configurations and methods for the removal of a gaseous component from process gases.

SUMMARY OF THE INVENTION

The present invention is generally directed to configurations and methods for acid gas removal from various feed gases, and especially low-pressure flue gases, wherein an absorber receives a lean and a semi-lean solvent stream, wherein each of the solvent streams is formed from a rich solvent by a first and second regenerator. In such configurations, it is especially preferred that first and second regenerators are heat-integrated, and additional heat integration between certain configurations and a power plant are also contemplated.

In one aspect of the inventive subject matter, a plant includes an absorber that removes an acid gas from a feed gas using a lean solvent and a semi-lean solvent, thereby producing a semi-rich solvent and a rich solvent. A first regenerator receives a first portion of the rich solvent, thereby producing the lean solvent and a first regenerator overhead, and a second regenerator receives a second portion of the rich solvent, thereby producing the semi-lean solvent and a second regenerator overhead, wherein the second regenerator overhead and the semi-lean solvent are substantially exclusively produced from the second portion of the rich solvent.

In especially preferred configurations of such plants, the second portion of the rich solvent is preheated in a heat exchanger against the lean solvent from the first regenerator, and/or the second regenerator receives steam from a component in the plant (e.g., flashed steam condensate from a steam reboiler of the first regenerator). Furthermore, it should be especially appreciated that in most, if not all of the contemplated configurations, the absorber will operate at a pressure that is lower than the pressure of the first and/or second regenerator. Such arrangements are particularly useful where the feed gas is a flue gas with relatively low pressure (e.g., less than 30 psia), and/or significant oxygen content (e.g. between 0.25% (vol.) and 20% (vol.)) at moderate carbon dioxide levels (e.g., between 0.25% (vol.) and 30% (vol.)).

Especially contemplated absorbers may include an intercooler that cools at least one of the semi-lean solvent and the semi-rich solvent (or a mixture thereof). With respect to heat integration of suitable acid gas removal configurations, it is generally contemplated that all processes that provide and/or receive heat energy may be operationally coupled to the acid gas removal configuration. However, it is generally preferred that the acid gas removal configuration may receive high-level heat from a power plant as well as the flue gas, and may further provide low level heat to the power plant (e.g., from the lean solvent cooler, the semi-lean solvent cooler, the regenerator condenser, and/or the intercooler).

Thus, viewed from another perspective, contemplated plants will preferably include an absorber that removes an acid gas from a low-pressure flue gas using a lean solvent and a semi-lean solvent, wherein the lean solvent is produced by a first regenerator operating at a first pressure, the semi-lean solvent is produced by a second regenerator operating at a second pressure, and wherein each of the first and second pressures are greater than a pressure of the low-pressure flue gas.

Various objects, features, aspects and advantages of the present invention will become more apparent from the following detailed description of preferred embodiments of the invention, along with the accompanying drawings in which like numerals represent like components.

DETAILED DESCRIPTION

The inventors discovered that configurations and methods in which a lean solvent and a semi-lean solvent are employed for removal of a gaseous component (and especially an acid gas) from a feed gas can be operated with improved efficiency when the lean solvent and semi-lean solvent are produced in separate regenerators. Unexpectedly, despite the increased solvent flow rate requirements of such configurations, the inventors discovered that all or almost all of the contemplated configurations provide significant economic advantages that are predominantly due to reducing heating energy demand.

Moreover, the inventors discovered that various operational aspects of contemplated configurations may be even further improved when (a) the semi-lean solvent regenerator is stripped with steam flashed from condensate produced in the lean regenerator reboiler, (b) an absorber intercooler is employed that maintains a lower solvent temperature across the absorber, and/or (c) where the heat energy in- and output is integrated with another plant (e.g., power plant, reformer plant, etc.).

Figure 1:
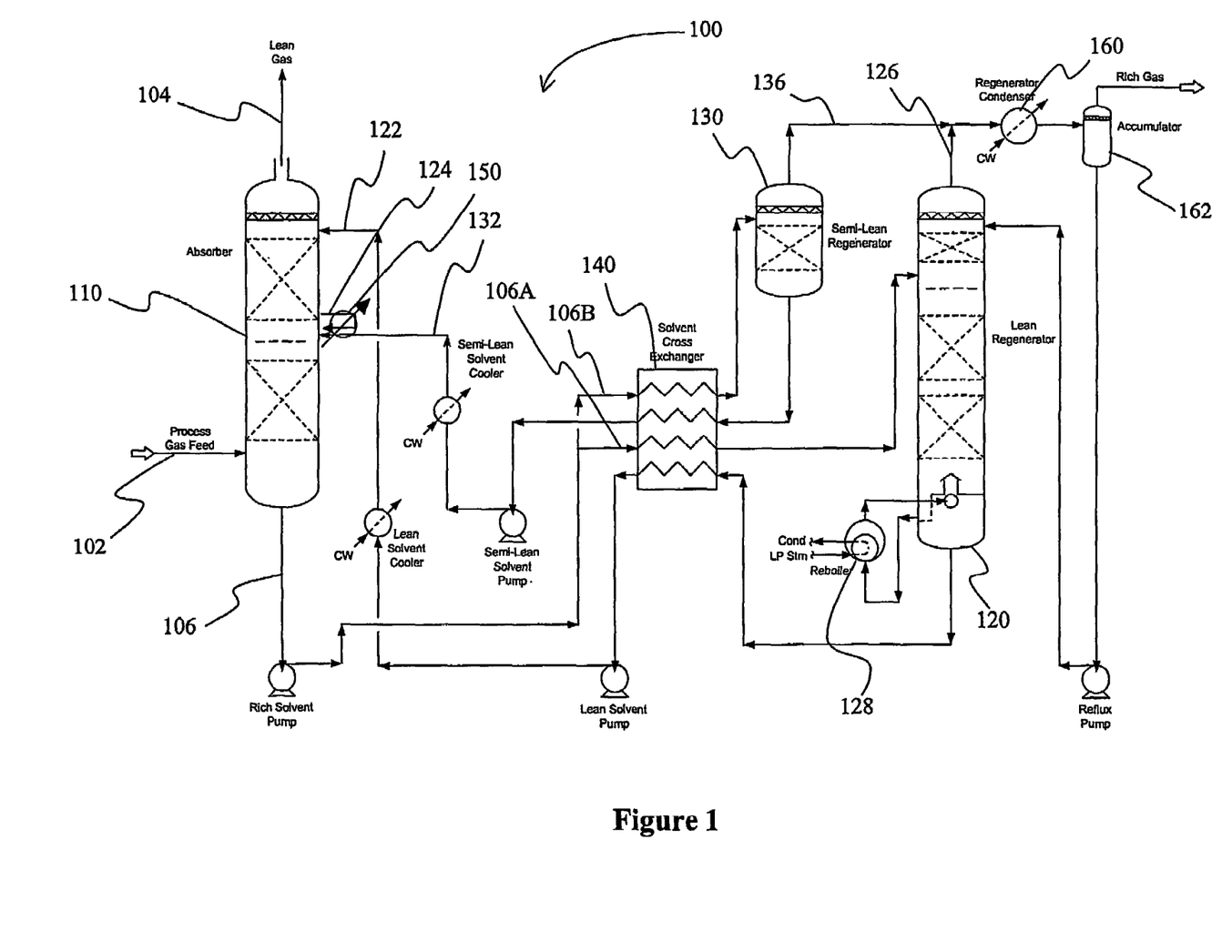
FIG. 1 is a schematic representation of one exemplary configuration of a gas processing plant according to the inventive subject matter.
Figure 2:
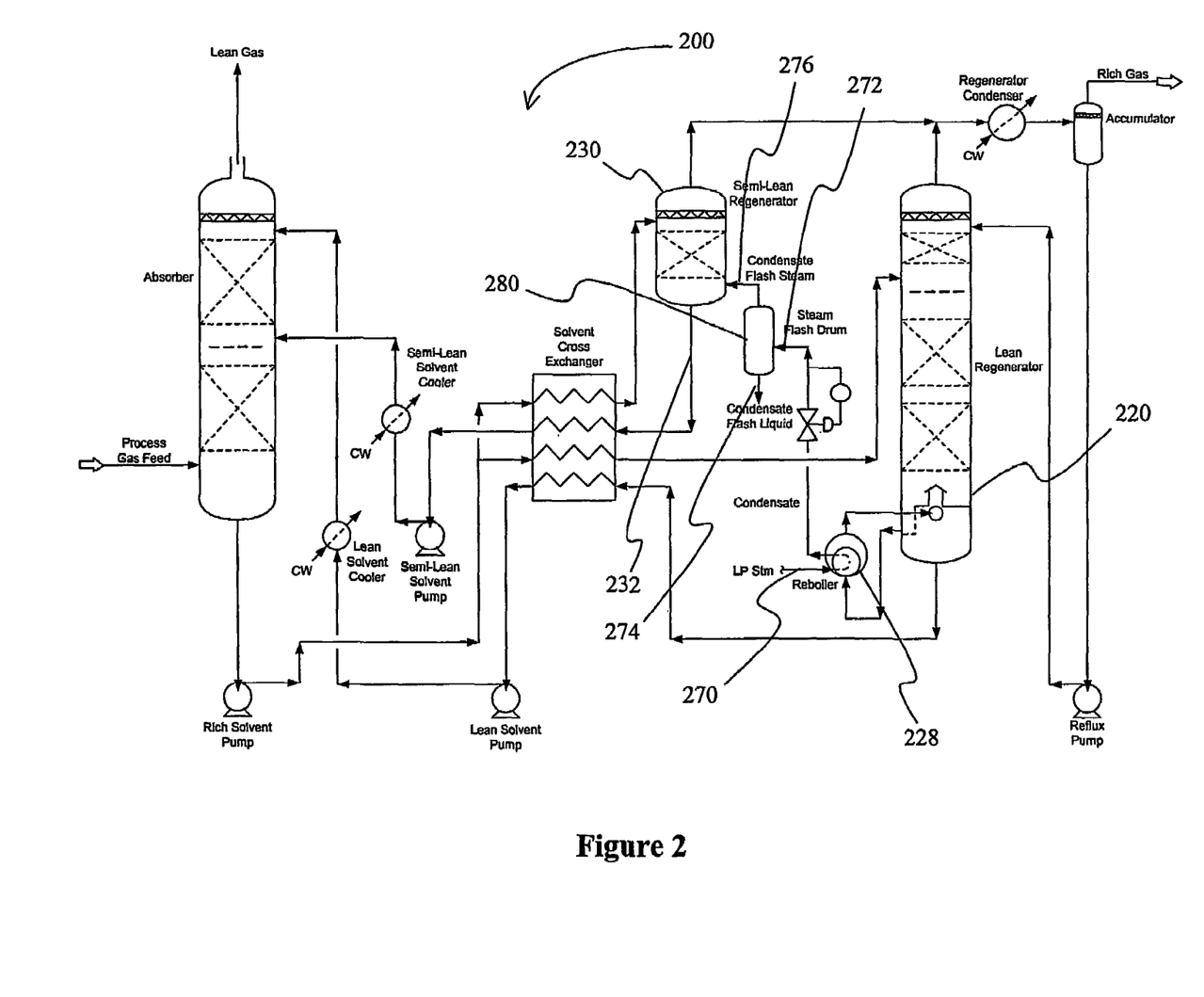
FIG. 2 is a schematic representation of another exemplary improved configuration of a gas processing plant according to the inventive subject matter.

One exemplary configuration is depicted in FIG. 1 in which a plant 100 in which a feed gas 102 enters the absorber 110 at feed gas pressure. Lean solvent 122 enters an upper portion of the absorber 110 and contacts the feed gas within the absorber to form semi-rich solvent 124, which is fed to a lower portion of the absorber 110. The semi-rich solvent 124 may be mixed with the semi-lean solvent 132 to form a mixed solvent (not shown). Alternatively, the semi-rich solvent 124 and the semi-lean solvent 132 may also enter the lower portion of the absorber separately. Furthermore, and depending on the particular configuration, semi-rich solvent 124, the semi-lean solvent 132, and/or the mixed solvent may be cooled by an absorber intercooler 150. It should further be recognized that multiple intercoolers may be used in conjunction with the teachings presented herein, wherein each of the intercoolers may cool a side draw of the absorber. Therefore, and in this context, multiple semi-rich solvent streams may be cooled. Consequently, a semi-lean cooler as shown in FIGS. 1 and 2 may be omitted.

Rich solvent 106 will leave the absorber 110 at or near the bottom of the absorber, and the processed feed gas will leave the absorber 110 as lean gas 104. The rich solvent 106 is then split into a first and second portion (106A and 106B, respectively), wherein both portions are heated in a solvent cross exchanger 140 against the lean solvent from the first regenerator 120 and the semi-lean solvent 132 from the second regenerator 130. Of course, it should be recognized that where desirable, the rich solvent may be first heated in the cross exchanger (or other suitable heat source) before the rich solvent is divided into the first and second portions.

The first regenerator 120 removes the gaseous component (e.g., acid gas) from the solvent 106A with heat provided by the steam reboiler 128. First regenerator overhead 126 is further cooled in regenerator condenser 160 and separated into condensate and acid gas in accumulator 162. The lean solvent 122 from the first regenerator 120 is re-introduced into the absorber 110 after heat exchange in cross exchanger 140 (supra).

The second regenerator 130 removes from the second portion 106B at least part of the gaseous component to generate semi-lean solvent 132 and second regenerator overhead 136, which is then combined with the first regenerator overhead 126. Stream 136 may also be washed in a top wash section of the first regenerator. It should be especially appreciated that the second portion of the rich solvent 106B is heated in the cross exchanger (e.g. against the lean solvent 122 and/or the semi-lean solvent 132) to promote regeneration of the semi-lean solvent without additional expenditure of heat energy. Additionally, or alternatively, as depicted in FIG. 2, regeneration of the semi-lean solvent 232 in the second regenerator 230 may also be assisted by steam 276 that is generated within the gas treatment plant 200 (or elsewhere). Here, steam 276 is derived from the steam reboiler 228 of the first regenerator 220, wherein the condensate 272 from reboiler 228 is flashed to the operating pressure of the second regenerator, and separated in the flash drum 280 into condensate flash liquid 274 and condensate flash steam 276 (with respect to the remaining configuration, the same considerations as for FIG. 1 apply). It should be especially recognized that in such configurations the steam will decrease the acid gas load in the semi-lean solvent, which will in turn reduce the overall solvent circulation rate. Remarkably, no additional steam needs to be imported from a source outside of the plant as that steam is already available as a byproduct of the steam reboiler.

It is generally contemplated that the source, composition, and other parameters of suitable feed gases may vary considerably, and the particular composition, pressure, temperature, etc. will predominantly depend on the particular source. However, especially preferred feed gases include flue gases from reformer burner or gas turbine exhausts. It should further be appreciated that gases other than flue gases from a combustion turbine are also contemplated, including natural gas, or various refinery gases, combustion gases, or combined gases from multiple sources, all of which may or may not be pretreated (contemplated pretreatment may include fractionation, filtration, scrubbing, and combination or dilution with other gases). Thus, the chemical composition may vary substantially, but suitable feed gases preferably have relatively low carbon dioxide (typically between 0.25 and 30 vol %) and relatively high oxygen content (typically between 0.25 and 20 vol %). Consequently, depending on the nature of the process gas and the physicochemical properties of the solvent, the gaseous compound is not necessarily limited to carbon dioxide, but may also include hydrogen sulfide, nitrogen, oxygen, hydrogen, and/or helium, etc.

It is further contemplated that the pressure of the feed gas is typically relatively low and will generally be in the range of between 0.1 psia and 30 psia However, contemplated higher pressures include pressures of between about 30 psia and 150 psia, and less typically between about than 150 psia and 300 psia. Similarly, the temperature of contemplated feed gases may vary and will predominantly depend on the particular source and/or use of a heat recovery unit.

With respect to the absorber, it is contemplated that all conventional absorbers are considered suitable for use in conjunction with the teachings presented herein. For example, contemplated absorbers include random packed-bed absorbers with a capacity of up to 30 million standard cubic feet per hour (and even more), but may include various alternative types, sizes, and capacities. Among other variations, contemplated absorbers may include structured packed-bed absorbers or trayed-type absorbers. Similarly, where relatively large capacities of process gas are to be purified, multiple absorbers with same or different capacity may be utilized. Contemplated feed gas capacities include flow rates of between 1-50 million standard cubic feet per hour (MMSCF/hr), and even higher flow rates between 50-100 MMSCF/hr are also contemplated. On the other hand, where smaller quantities of process gas are to be purified, flow rates of between 0.1-50 MMSCF/hr and less are also deemed suitable.

It should be particularly noted that in preferred aspects of the inventive subject matter the absorber operates at a pressure that is substantially identical (+/− 5 psi) to the pressure of the feed gas (which may be directly provided to the absorber as exhaust with or without a blower). Therefore, suitable absorber pressures will typically be in the range of between about 5 psia to 25 psia, more typically in the range of about 10 to 20 psia, and most typically in the range of about 14-17 psia. Alternatively, the absorber pressure may also exceed 20 psia, and suitable pressures of up to 300 psia (and even higher) are not excluded.

Similarly, it should be recognized that the first and second regenerators may vary substantially in type and volume, and the type and volume of suitable regenerators will depend at least in part on the absorber and nature of the feed gas. Therefore, it is generally contemplated that all conventional configurations are deemed suitable for use in conjunction herein so long as a first and second regenerator receive a first and second portion of a rich solvent directly or indirectly from the absorber, respectively, and so long as the overhead and the semi-lean solvent of the second regenerator are substantially exclusively produced from the second portion of the rich solvent. The term "substantially exclusively produced from the second portion of the rich solvent" as used herein means that the rich gaseous stream leaving the top of the first regenerator is typically not (or if so, then no more than 20 vol %) routed into the semi-lean solvent regenerator, and/or that the feed to the second regenerator comprises at least 80% of the second portion of the rich solvent. Optionally added stripping gas or steam (see e.g., FIG. 2) is not included in this definition.

Consequently, it should be especially recognized that the partial pressure of the acid gas component in any vapor feed in the second regenerator remains relatively low. Furthermore, it should be appreciated that the second regenerator may be operated as a flash drum that receives heated rich solvent and that may further receive steam to reduce the acid gas partial pressure above the solvent in the flash drum.

With respect to suitable pressures in the first and second regenerators, it is generally contemplated that the pressure in at least one of the first and second regenerator is higher than in the absorber, and it should be recognized that a particular pressure in the first and/or second regenerator will predominantly depend on the particular solvent and solvent concentration, temperature, and/or (residual) carbon dioxide loading in the solvent. Thus, contemplated pressure differences between at least one of the regenerators and the absorber will be at least 2 psi, more typically at least 5 psi, and most typically between 10-15 psi. Furthermore, with respect to the amount of steam provided to the second regenerator, it should be recognized that the steam quantities may vary considerably.

Likewise, the reboiler of the first regenerator is not restricted to a steam operated reboiler, but may also be alternative reboilers, including oil-heated, or flame heated, or electrically heated reboilers. Furthermore, it should be recognized that suitable pumps, valves, and piping will be readily available to a person of ordinary skill in the art, and that their implementation into the configurations according to the inventive subject matter will not require undue experimentation.

With respect to the solvent, it is generally preferred that the solvent is an aqueous amine-containing solvent (chemical solvent), and particularly preferred solvents include those comprising monoethanolamine (MEA). However, it should be recognized that numerous alternative solvents are also considered appropriate, including physical and chemical solvents, and any reasonable combination thereof. For example, physical solvents include SELEXOL™ (a dimethyl ether of polyethylene glycol) and methanol, while chemical solvents include organic amines and mixed amines. Especially contemplated chemical solvents are MEA, diethanolamine, diglycolamine, and methyldiethanolamine. It should further be appreciated that co-solvents in combination with contemplated solvent are also appropriate. Suitable solvents are generally commercially available, or may be prepared to specification for selected purposes. Furthermore, and especially where the feed gas comprises appreciable quantities of oxygen, contemplated solvents may additionally include corrosion inhibitors. There are numerous corrosion inhibitors known in the art, and exemplary inhibitors are described, for example, in U.S. Pat. Nos. 6,036,888, 4,596,849, or 4,372,873. Still further suitable reagents that may be added or included to contemplated solvents are anti-foam agents, buffers, metal salts, etc.

With respect to the heating of the rich solvent stream(s) and cooling of the lean solvent stream and/or semi-lean solvent stream, it is contemplated that various devices other than a cross heat exchanger are also appropriate. For example, the rich solvent stream may be heated utilizing residual heat from the steam reboiler, or from heat sources other than a heat exchanger, including hot fluids, hot gases, and electricity. Similarly, the cooling of the lean solvent stream and semi-lean solvent stream may be performed with a single, or two independent cooling devices that employ water, air, or other refrigerants as coolants. The cooling devices may thereby be energetically coupled or independent from the gas purification process. Although side coolers are preferably employed for such cooling, various alternative configurations are also contemplated, including multiple side coolers or a single side cooler with two independent channels for the two solvent streams. Still further, and especially where the semi-rich solvent stream is mixed with the semi-lean solvent stream, the intercooler may be employed to cool the mixed solvent, and/or the semi-rich and/or semi-lean solvent stream. Contemplated coolers preferably reduce the temperature of the lean solvent stream and the semi-lean solvent stream more than 10° C., more preferably more than 25° C., and most preferably more than 50° C. However, and especially where an intercooler is employed, alternative reductions of temperature are also considered suitable. Alternative cooling systems include coil-cooled trays, or internal heat exchangers.

In still further alternative aspects of the inventive subject matter, the semi-rich solvent stream need not be limited to a single semi-rich solvent stream with a particular carbon dioxide loading (e.g., greater than 0.3), but may include multiple semi-rich solvent streams with identical or different carbon dioxide loading, so long as at least part of the semi-rich solvent stream is fed back to a lower portion of the absorber. For example, appropriate semi-rich solvent streams may be drawn off the absorber at different positions that may or may not have the same vertical distance from the top of the absorber. Further configurations and aspects relevant to contemplated configurations and methods can be found in our commonly owned U.S. Pat. No. 6,645,446 which is incorporated by reference herein.

Figure 3:
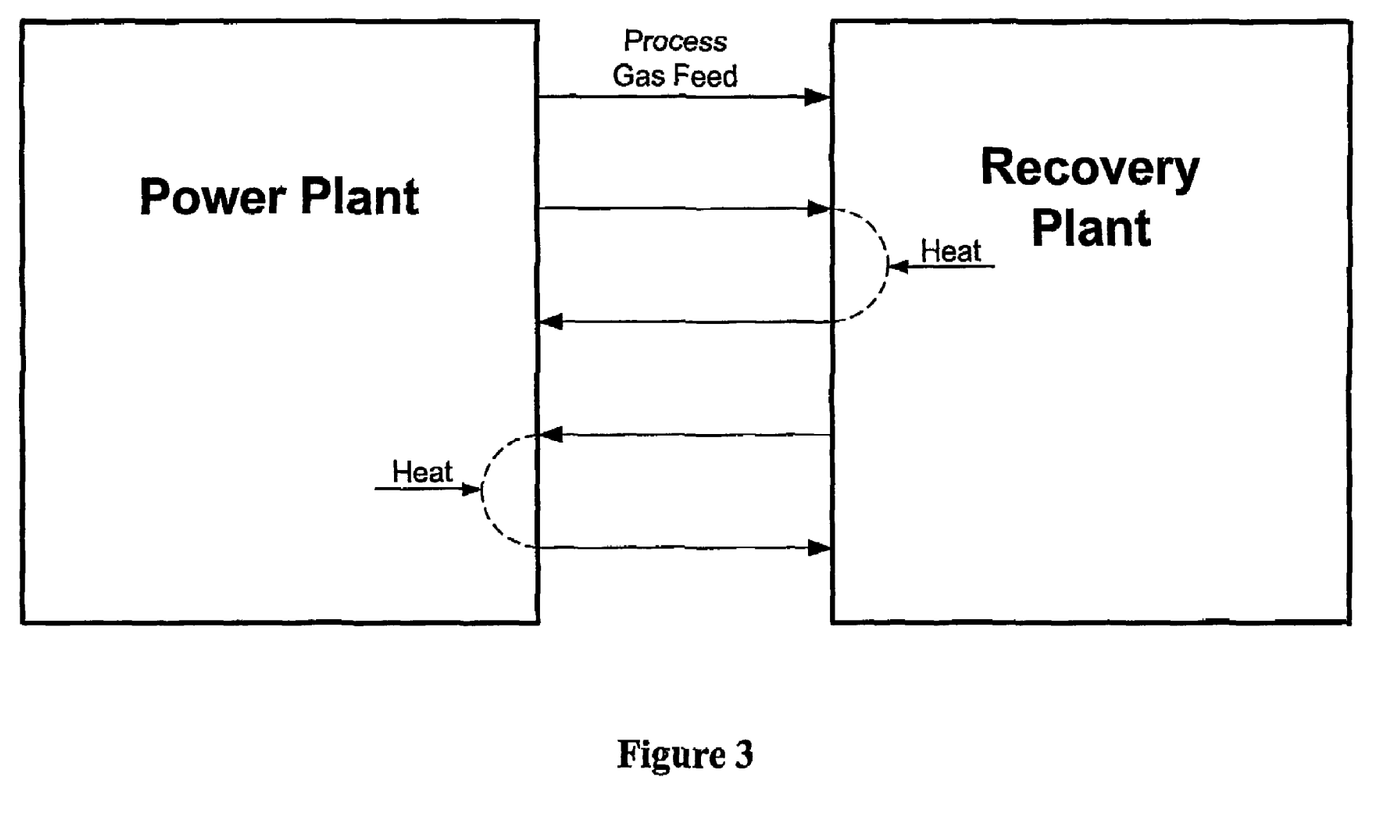
FIG. 3 is a schematic representation of one exemplary improved configuration of a gas processing plant according to the inventive subject matter.

In still further contemplated aspects of configurations and methods according to the inventive subject matter, the low pressure steam 270 for the reboiler may also be provided by a source other than the gas treatment plant, and especially suitable sources include heat recovery units of various plants (infra). Thus, and at least from one perspective as shown in FIG. 3, contemplated plant configurations include those in which a recovery plant (e.g., gas treatment plant for recovery of carbon dioxide) is heat-integrated with a power plant, wherein low-level heat is provided by the recovery plant to the power plant, while high-level heat is provided from the power plant to the recovery plant. For example, a recovery plant may provide heating for boiler feed water of a power plant from recovery plant heat sources that include solvent coolers (e.g., lean solvent cooler, semi-lean solvent cooler), or condensers (e.g., regenerator condenser), while the power plant may advantageously provide heat to convert low pressure steam condensate into low pressure steam that operates the steam reboiler of the first regenerator in the recovery plant. The terms "gas treatment plant", "gas processing plant" and "recovery plant" are used interchangeably herein and refer to contemplated plants in which a gaseous component (typically acid gas, most typically carbon dioxide) is removed from a feed gas.

Figure 4A:
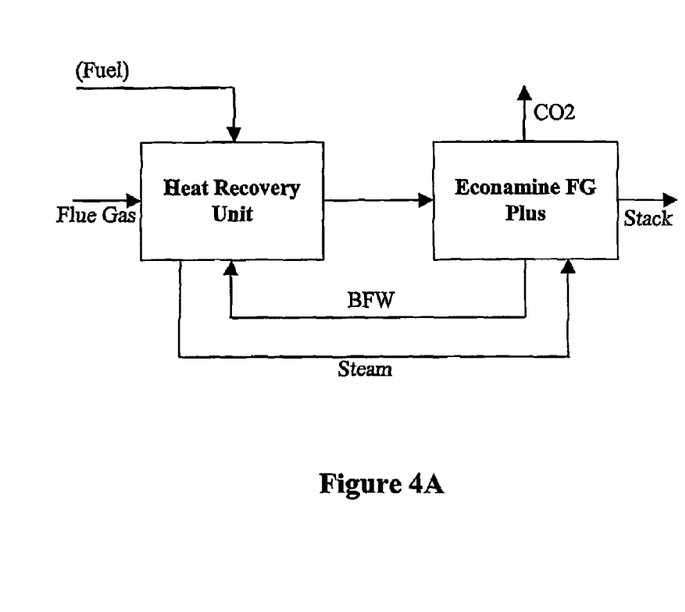
FIG. 4A is a schematic representation of one exemplary configuration for heat integration of a gas processing plant according to the inventive subject matter.
Figure 4B:
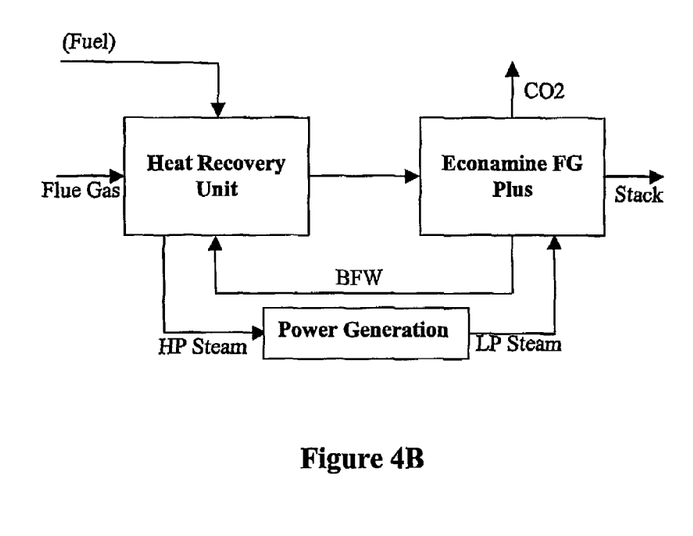
FIG. 4B is a schematic representation of another exemplary configuration for heat integration of a gas processing plant according to the inventive subject matter.

Still further preferred heat-integration schemes of contemplated plants include those in which the heat energy demand for the recovery plant is at least in part, or even entirely provided by the source of the feed gas that is to be treated with the recovery plant. For example, FIG. 4A depicts a configuration in which flue gas (e.g., from a reformer) is directed through a heat recovery unit in which boiler feed water is converted to low pressure steam that can be used to operate the first regenerator of a plant having a configuration of FIG. 1. Where required, extra fuel may be used to raise the temperature in the heat recovery unit (e.g., via duct firing). Alternatively, as shown in FIG. 4B, where the heat of the flue gas in the heat recovery unit is sufficiently high, power may be generated using high pressure steam that is generated in the heat recovery unit. Resulting low pressure steam from the power generation may then be employed in the recovery unit to drive processes that require heat energy (e.g., steam reboiler for first regenerator). Thus, it should be particularly recognized that where heretofore known acid gas removal plants satisfied their heat demands with a separate steam boiler (which in turn generated again acid gases in the boiler furnace), contemplated configurations employ the heat content of the of the flue gas (or other heat source in the plant that generates the flue gas) to drive the heat-dependent process(es) in the recovery plant.

Such heat integration configurations are particularly advantageous where the flue gas contains oxygen in an amount sufficient to support combustion of additional fuel (typically oxygen concentration of 4% (vol.), or more). Therefore, especially suitable flue gases include gas turbine exhausts and reformer flue gases. In such configurations, a heat recovery unit is positioned upstream of a flue gas treating unit (e.g.,desulfurization and/or carbon dioxide removal) in which duct firing is performed via injection of natural gas or other fuel to the flue gas. The combustion of the natural gas or other fuel with the remaining oxygen of the flue gas increases the flue gas temperature to the point that steam can be raised and sent to the reboiler of the first regenerator of FIG. 1 or 2.

Among other advantages, it should be recognized that such processes are typically superior to generation of steam from a boiler or extraction from a steam turbine, since (a) the flue gas is already hot, and consequently the amount of natural gas or other fuel required is smaller than the amount required in a boiler; (b) the flue gas becomes more concentrated in carbon dioxide, thereby significantly increasing the efficiency of carbon dioxide capture in the process; (c) the flue gas oxygen concentration is reduced, thus reducing the rates of amine degradation in the acid gas removal process, (d) the hot temperature reached after duct firing allows for the addition of a $NO_x$ removal unit, (e) prevent new emissions of carbon dioxide from a separate boiler otherwise required to raise steam for the solvent regeneration, and (f) reduces overall cost.

To determine the economic benefit of an exemplary configuration using contemplated heat integration configurations, comparative simulations were performed using a process resulting in the production of 413 ton/day of carbon dioxide (see FIG. 4B). For comparison (case A), a typical reformer flue gas, containing 6.0% carbon dioxide at 302° F. was sent directly to a flue gas desulfurization and Econamine FG Plus (process substantially as depicted in FIGS. 1 and 2) processes. In contrast (case B), the same flue gas was sent first through a heat recovery unit which was heat integrated with the same flue gas desulfurization and Econamine FGPlus process. The two cases were compared at constant moles of carbon dioxide recovered and constant absorber packing height. The Econamine FG Plus process was designed with split flow configuration, intercooled absorber, 35 wt % aqueous MEA as solvent, and with 15° F. minimum cross exchanger approach temperature. The heat recovery unit was designed with a minimum approach temperature of 15° F. The temperature of the flue gas in the desulfurization/DCC unit was set to 104° F.

|  |  | A | B |
|---|---|---|---|
| EFG Feed Gas $CO_2$ Concentration | % v/v | 6.0 | 7.2 |
| EFG Feed Gas $O_2$ Concentration | % v/v | 6.8 | 4.7 |
| EFG Solvent Circulation Rate | gpm | 1,873 | 1,652 |
| EFG Specific Reboiler Duty | Btu/lb $CO_2$ | 1,597 | 1,487 |
| Blower BHP | hp | 1,154 | 1,316 |
| Flue Gas Max Temperature | ° F. | 302 | 786 |
| Flue Gas to Treating Temperature | ° F. | 302 | 297 |

The flue gas carbon dioxide concentration increases from 6.0 to 7.2%, thus increasing the MEA solvent capacity. The same removal can be obtained with a lower circulation rate and the increased rich loading makes stripping easier. The result is a reduction of reboiler duty of approximately 6.9%. The blower power increases, due to the pressure drop that the flue gas undergoes in the heat recovery unit (set to 10" $H_2O$).

Alternatively, power may be generated by production of higher pressure steam in the heat recovery unit (see FIG. 4B). The steam can be superheated and expanded in a turbine and the extraction steam (50 psig, superheated) can be sent to the reboiler, while some power is produced to satisfy the demand of the Econamine FG Plus process. A third case (C) was run with the simulator to reproduce this configuration, with a steam pressure of 450 psig. The Table below reports the results of that simulation, comparing the third case C to case B.

|  |  | B | C |
|---|---|---|---|
| Steam Pressure | psig | 50 | 450 |
| Mass of $CH_4$ required | lbs/hr | 2,385 | 3,044 |
| Flue Gas Max Temperature | ° F. | 786 | 911 |
| Flue Gas to Treating Temperature | ° F. | 297 | 372 |
| EFG Feed Gas $CO_2$ Concentration | % v/v | 7.2 | 7.5 |
| Blower BHP | hp | 1,316 | 1,312 |
| Expander Power Output | hp | N/A | 2,847 |

As can be seen, by using approximately 30% more natural gas, 2,847 hp are produced (2.1 MW). This power completely satisfies the consumption of the blower, which is by far the most power consuming unit in the process.

Therefore, the inventors generally contemplate a plant that includes an absorber that removes an acid gas from a feed gas using a lean solvent and a semi-lean solvent, thereby producing a semi-rich solvent and a rich solvent. Such plants will further comprise a first regenerator that receives a first portion of the rich solvent, thereby producing the lean solvent and a first regenerator overhead, and a second regenerator that receives a second portion of the rich solvent, thereby producing the semi-lean solvent and a second regenerator overhead, wherein the second regenerator overhead and the semi-lean solvent are substantially exclusively produced from the second portion of the rich solvent. Preferably, the second portion of the rich solvent is preheated in a heat exchanger against the lean solvent from the first regenerator, and/or the second regenerator further receives steam from a component in the plant (e.g., steam reboiler of the first regenerator; therefore, the steam may be a flashed steam condensate from the steam reboiler).

In most, if not all of preferred aspects, the absorber (preferably further comprising an intercooler cooling the semi-lean, semi-rich, and/or a mixed solvent) will operate at a pressure that is lower than an operating pressure of the first regenerator and an operating pressure of the second regenerator. For example, a suitable feed gas entering the absorber may be a flue gas at a pressure of no more than 20 psia (e.g., the acid gas in the feed gas is carbon dioxide and has a concentration of between 0.5% (vol.) and 3.5% (vol.) and wherein the feed gas further comprises oxygen at a concentration of between 5% (vol.) and 15% (vol.)).

Contemplated plants may further be heat integrated with other plants (e.g., ammonia gas production plants with a reformer, a power plant with a gas turbine, etc.) that may provide heat (typically high-level heart for steam reboiler) and advantageously the feed gas, while the other plant may also receive heat from contemplated plants (typically low level heat to preheat boiler feed water). Thus, viewed from another perspective, contemplated plants will include an absorber that removes an acid gas from a low-pressure flue gas using a lean solvent and a semi-lean solvent, wherein the lean solvent is produced by a first regenerator operating at a first pressure, the semi-lean solvent is produced by a second regenerator operating at a second pressure, and wherein each of the first and second pressures are greater than a pressure of the low-pressure flue gas.

Thus, specific embodiments and applications of improved split flow configurations and processes have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced

What is claimed is:

1. A plant comprising:
an absorber that is configured to remove an acid gas from a feed gas, wherein the absorber is further configured to receive a lean solvent and a semi-lean solvent and to produce a semi-rich solvent and a rich solvent;
a first regenerator fluidly coupled to the absorber and configured to receive a first portion of the rich solvent and further configured to produce the lean solvent and a first regenerator overhead;
a second regenerator fluidly coupled to the absorber and configured to receive a second portion of the rich solvent and further configured to produce the semi-lean solvent and a second regenerator overhead;
a heat exchanger operationally coupled to the absorber and configured to preheat the second portion of the rich solvent against the lean solvent from the first regenerator; and
wherein the first and second regenerators are configured such that the second regenerator overhead and the semi-lean solvent that is fed to the absorber are substantially exclusively produced from the second portion of the rich solvent.

2. The plant of claim 1 wherein the second regenerator is further configured to receive steam from a component in the plant.

3. The plant of claim 2 wherein the component is a steam reboiler of the first regenerator and wherein the steam is a flashed steam condensate from the steam reboiler.

4. The plant of claim 1 wherein the absorber is configured to operate at a pressure that is lower than an operating pressure of the first regenerator and an operating pressure of the second regenerator.

5. The plant of claim 4 wherein the feed gas comprises flue gas at a pressure of no more than 30 psia.

6. The plant of claim 5 wherein the acid gas in the feed gas is carbon dioxide and has a concentration of between 0.25% (vol.) and 30% (vol.) and wherein the feed gas further comprises oxygen at a concentration of between 0.25% (vol.) and 20% (vol.).

7. The plant of claim 1 wherein the absorber is coupled to an intercooler that is configured to receive and cool at least a portion of the semi-rich solvent to thereby form a cooled semi-rich solvent.

8. The plant of claim 7 further comprising fluid conduits that are configured to allow mixing of at least a portion of the semi-lean solvent with the semi-rich solvent to thereby form a mixed solvent, and wherein the intercooler is configured to cool the mixed solvent to form a cooled mixed solvent suitable for introduction into the absorber.

9. The plant of claim 1 wherein the absorber is coupled to an intercooler that is configured to receive and cool at least a portion of the semi-lean solvent to thereby form a cooled semi-lean solvent suitable for introduction into the absorber.

10. The plant of claim 1, optionally comprising an intercooler that is operationally coupled to the absorber, and a power plant or reforming plant operationally coupled to the plant, wherein the power plant or reforming plant is configured to provide energy for a reboiler of the first regenerator, and the absorber feed gas, and optionally wherein a heat recovery unit that employs duct firing is configured to provide the energy.

11. The plant of claim 10 further comprising at least one of a lean solvent cooler, a semi-lean solvent cooler, and a regenerator condenser, each configured to allow providing heat to the power plant.

12. The plant of claim 1, optionally comprising an intercooler that is operationally coupled to the absorber, further comprising at least one of a lean solvent cooler, a semi-lean solvent cooler, and a regenerator condenser, wherein a power plant is operationally coupled to the plant and wherein the power plant is configured to allow providing of heat to the power plant by at least one of the lean solvent cooler, the semi-lean solvent cooler, the regenerator condenser, and the intercooler.

13. A plant comprising:
an absorber that is configured to remove an acid gas from a low-pressure flue gas and further configured to receive a lean solvent and a semi-lean solvent,
a first regenerator configured to operate at a first pressure and to produce the lean solvent,
a second regenerator configured to operate at a second pressure and to produce the semi-lean solvent
wherein the absorber is further configured such that the lean solvent and the semi-lean solvent are fed to the absorber, and such that each of the first and second pressures are greater than a pressure of the low-pressure flue gas.

14. The plant of claim 13 wherein the first and second regenerators are configured to receive a first and second portion of a rich solvent, respectively, and
wherein the absorber is further configured to produce the rich solvent.

15. The plant of claim 14 wherein the second portion of the rich solvent is heated by the lean solvent of the first regenerator before the second portion of the rich solvent enters the second regenerator.

16. The plant of claim 13 wherein the second regenerator is further configured to receive steam flashed from condensate of a steam reboiler of the first regenerator.

17. The plant of claim 13 wherein the absorber is coupled to an intercooler, and wherein the intercooler is configured to cool at least one of a semi-rich solvent produced by the absorber and the semi-lean solvent produced by the second regenerator.

18. The plant of claim 13 wherein the low pressure flue gas comprises no more than 30%(vol.) carbon dioxide and less than 20%(vol.) oxygen, and wherein the low pressure flue gas has a pressure of no more than 30 psia.

19. The plant of claim 13, optionally comprising an intercooler that is operationally coupled to the absorber, wherein a power plant or reforming plant is operationally coupled to the plant, and wherein the power plant is configured to provide heat for a reboiler of the first regenerator, and absorber feed gas, and wherein the power plant or reforming plant is further configured to optionally receive heat from the plant by at least one of a lean solvent cooler, a semi-lean solvent cooler, a regenerator condenser of the plant, and the intercooler.

* * * * *